(12) United States Patent
Reznar

(10) Patent No.: US 7,621,507 B2
(45) Date of Patent: Nov. 24, 2009

(54) BREAK-AWAY CABLE SHEAVE FOR TIRE CARRIER

(75) Inventor: Jason Reznar, Redford, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 627 days.

(21) Appl. No.: 11/539,659

(22) Filed: Oct. 9, 2006

(65) Prior Publication Data

US 2008/0083912 A1    Apr. 10, 2008

(51) Int. Cl.
*B66D 1/00* (2006.01)
*B62D 43/00* (2006.01)

(52) U.S. Cl. ............................ 254/323; 414/463
(58) Field of Classification Search ................ 254/323, 254/378; 414/463, 466
See application file for complete search history.

(56) References Cited

U.S. PATENT DOCUMENTS

| | | | | |
|---|---|---|---|---|
| 4,059,197 A * | 11/1977 | Iida | | 414/463 |
| 4,535,973 A * | 8/1985 | Dorr et al. | | 254/323 |
| 4,544,136 A * | 10/1985 | Denman et al. | | 254/323 |
| 4,625,947 A * | 12/1986 | Denman et al. | | 254/323 |
| 4,997,164 A * | 3/1991 | Kito et al. | | 254/323 |
| 5,251,877 A * | 10/1993 | Rempinski et al. | | 254/323 |
| 5,368,280 A * | 11/1994 | Ng | | 254/376 |
| 5,415,377 A * | 5/1995 | Britt et al. | | 254/323 |
| 6,132,162 A * | 10/2000 | Kito et al. | | 414/463 |
| 6,409,454 B1 * | 6/2002 | Yamamoto | | 414/463 |
| 6,554,253 B1 * | 4/2003 | Dobmeier et al. | | 254/323 |
| 6,923,394 B2 * | 8/2005 | Goldstein | | 242/323 |
| 7,404,545 B2 * | 7/2008 | Steiner et al. | | 254/323 |
| 2006/0169958 A1 * | 8/2006 | Steiner et al. | | 254/323 |
| 2009/0032786 A1 * | 2/2009 | Steiner et al. | | 254/323 |

* cited by examiner

*Primary Examiner*—Evan H Langdon
(74) *Attorney, Agent, or Firm*—Porter Wright Morris & Arthur LLP; Richard M. Mescher; Dean B. Watson

(57) ABSTRACT

A tire carrier assembly for storing a spare tire includes a carrier for supporting the spare tire, a rotatable sheave, and a flexible member operably connecting the carrier to the sheave. The flexible member is wound upon and unwound from the sheave upon rotation of the sheave to raise and lower the carrier between a stowed position and a deployed position. A drive member is operably connected the sheave to selectively rotate the sheave. The connection between the sheave and the drive member is broken upon a predetermined torque indicative of a catastrophic event so that the sheave is freely rotatable to prevent failure of the flexible member. A preferred sheave has first and second portions that break away at the predetermined torque so that the reel is freely rotatable.

19 Claims, 3 Drawing Sheets

BREAK-AWAY CABLE SHEAVE FOR TIRE CARRIER

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a tire carrier for a motor vehicle and, more particularly, to such a tire carrier which stores a spare tire beneath the motor vehicle.

BACKGROUND OF THE INVENTION

Vehicles with inflatable tires such as passenger cars, sport utility vehicles, light and heavy duty trucks, tractor trailers, buses, commercial delivery vehicles, among other motorized forms of transportation and trailers pulled by such vehicles are conventionally equipped with spare tires. Some spare tires are stored underneath the vehicle using a tire carrier which includes a tire winch for raising and lowering the spare tire between a raised or stored position wherein the vehicle can be operated and a lowered or accessed position wherein the spare tire can be installed or removed form the tire carrier. When the operator needs the spare tire, such as when there is a flat tire, the operator operates the winch to lower the spare tire from the raised position to the lowered position. In the lowered position the operator can remove the spare tire from the tire carrier. The winch typically raises and lowers the spare tire using a flexible member such as a cable or cord which is wound and unwound on a sheave or reel. The winch can be manual or power operated to rotate to rotate the sheave.

Many tire carriers provide a secondary latch mechanism or other system to secure the spare tire in the stored position upon a catastrophic event. For example, upon a catastrophic event such as a collision, the spare tire can be thrown with forces greater than the cable can withstand. If the cable fails, the secondary latch mechanism "catches" the spare tire to ensure that the spare tire remains within the confines of the vehicle.

While these prior tire carriers may adequately stow spare tires beneath motor vehicles, the secondary latch mechanism can be costly and adds weight to the vehicle. There is a never ending desire in the motor vehicle industry to reduce the cost of components and/or to reduce the weight of components. Additionally, while the tire carriers maintain the spare tire within the confines of the vehicle upon failure of the cable, the cable is permitted to fail. Replacement of the failed cable can be relatively costly. Accordingly, there is a need in the art for an improved tire carrier assembly.

SUMMARY OF THE INVENTION

The present invention provides a tire carrier assembly and sheave which address at least some of the above-noted problems of the related art. According to the present invention, a tire carrier assembly includes, in combination, a carrier adapted for supporting the spare tire, a rotatable sheave, a flexible member operably connecting the carrier to the sheave, and a drive member is operably connected to the sheave to selectively drive the sheave so that the sheave rotates. The flexible member is wound upon and unwound from the sheave upon rotation of the sheave to raise and lower the carrier between a stowed position wherein the carrier is inaccessible and a deployed position wherein the carrier is accessible. The drive connection between the drive member and the sheave is broken upon a predetermined torque so that the sheave is freely rotatable to prevent failure of the flexible member.

According to another aspect of the present invention, a tire carrier assembly includes, in combination, a carrier adapted for supporting the spare tire, a rotatable sheave, a flexible member operably connecting the carrier to the sheave, and a drive member operably connected to the sheave to selectively drive the sheave so that the sheave rotates. The flexible member is wound upon and unwound from the sheave upon rotation of the sheave to raise and lower the carrier between a stowed position wherein the carrier is inaccessible and a deployed position wherein the carrier is accessible. The sheave has a first portion forming a reel for winding and unwinding the flexible member and a second portion forming the drive connection with the drive member. Wherein the first portion breaks away from the second portion at a predetermined torque so that the reel is freely rotatable to prevent failure of the flexible member.

According to another aspect of the present invention, a sheave for a tire carrier assembly of a vehicle having a carrier raised and lowered by a flexible member, comprises, in combination, a first portion forming a reel for winding and unwinding the flexible member and a second portion forming a gear. The first portion comprises a polymer material and the second portion comprises a metal. The first portion is molded to the second portion so that the first portion breaks away from the second portion at a predetermined torque and the reel is freely rotatable to prevent failure of the flexible member.

From the foregoing disclosure and the following more detailed description of various preferred embodiments it will be apparent to those skilled in the art that the present invention provides a significant advance in the technology and art of tire carriers. Particularly significant in this regard is the potential the invention affords for providing a high quality, reliable, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
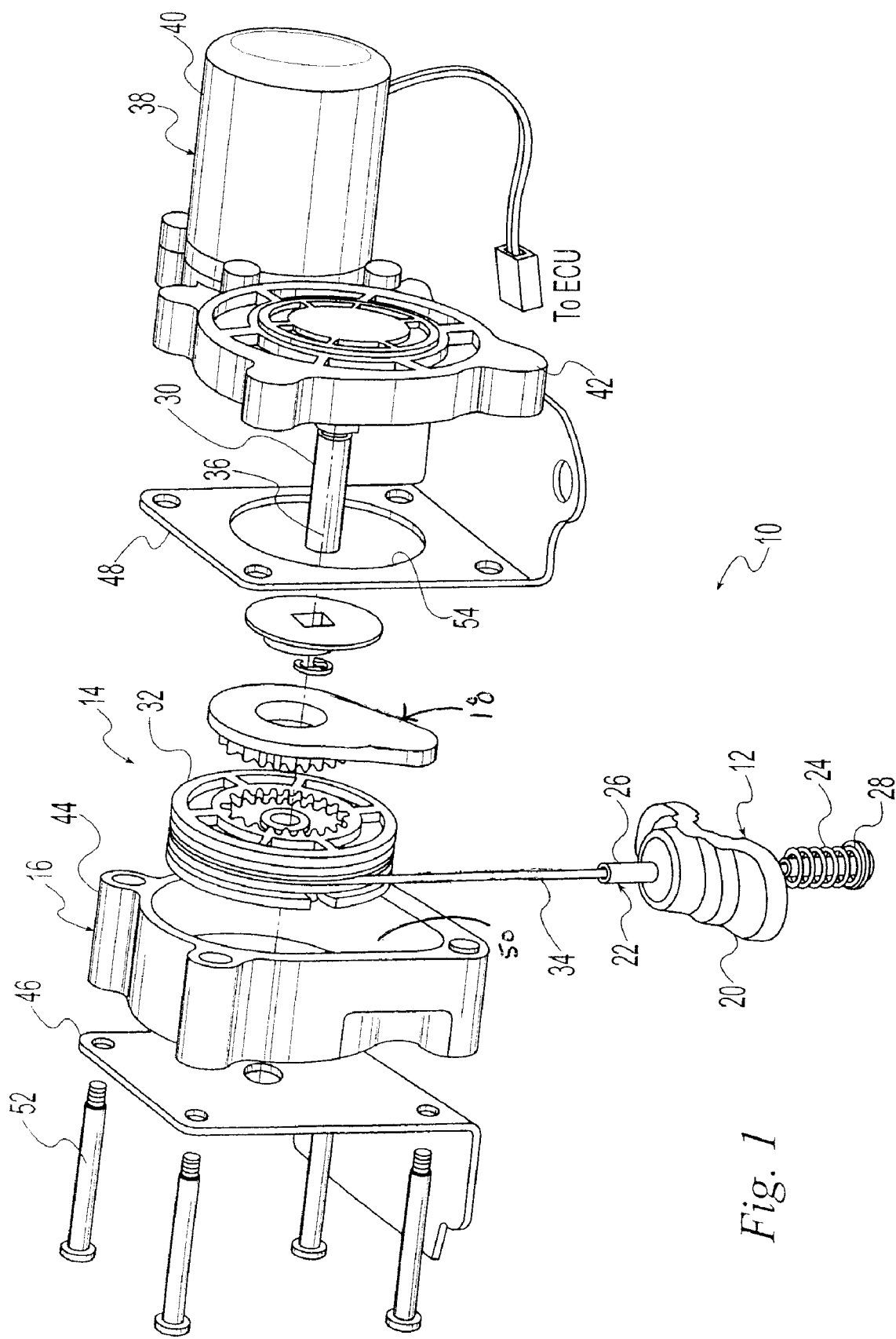
FIG. 1 is an exploded view of a tire carrier assembly according to a preferred embodiment of the present invention.

It should be understood that the appended drawings are not necessarily to scale, presenting a somewhat simplified representation of various preferred features illustrative of the basic principles of the invention. The specific design features of a tire carrier for a motor vehicle as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the tire carriers illustrated in the drawings. In general, up or upward refers to an upward direction within the plane of the paper in FIG. 1 and down or downward refers to a downward direction within the plane of the paper in FIG. 1. Also in general, fore or forward refers to a direction toward the front of the vehicle, and aft or rearward refers to a direction toward the rear of the vehicle.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved tire carrier assemblies disclosed herein. The following detailed discussion of various alternative and preferred embodiments will illustrate the general principles of the invention with reference to tire carriers for a motor vehicle such as a truck, van, cross over vehicle, sport utility vehicle (SUV), or the like. Other embodiments suitable for other applications will be apparent to those skilled in the art given the benefit of this disclosure such as for example for use with automobiles, recreational vehicles, trailers, off road vehicles such as dune buggies, industrial equipment, golf carts, and the like.

Referring now to the drawings, FIG. 1 shows a tire carrier assembly 10 according to a preferred embodiment of the present invention. The illustrated tire carrier assembly 10 includes a tire carrier 12 for carrying and supporting a spare tire thereon, a winch assembly 14 for raising and lowering the tire carrier 12 between an upper or stored position and a lower or accessed position, and a housing assembly 16 for at least partially housing the winch assembly 14 and mounting the various components to the motor vehicle. The stored position is preferably adjacent the bottom of the motor vehicle wherein access is not provided to the tire carrier 12 or the spare tire and the motor vehicle can be operated. The accessed position is preferably spaced below the storing position on or near the ground surface wherein access is provided to the tire carrier 12 and the spare tire 11 so that the spare tire can be placed on and removed from the tire carrier 12. Optionally, a secondary latch assembly (not shown) may be provided for securing or confining the tire carrier 12 in the storing position as disclosed in U.S. Pat. No. 6,267,546 or U.S. patent application Ser. No. 10/127,298 filed on Apr. 22, 2002, the disclosures of which are both expressly incorporated herein in their entireties by reference.

The tire carrier 12 includes a tire plate or carrier 20, a swivel 22, and a biasing or spring member 24. The tire plate 20 is adapted for supporting the spare tire 11 thereon. The illustrated tire plate 20 is adapted to support a wheel or rim of the spare tire 11. It is noted that the tire plate 20 can have many different forms within the scope of the present invention. The swivel 22 vertically extends through the tire plate 20 and includes a tubular portion 26 which extends above the tire plate 20. The tubular portion 26 can take on many sizes and shapes depending on the application requirements and the interaction with other components as will be discussed hereinafter. The illustrated tubular portion 26 is cylindrical and extends longitudinally through the tire plate 20. The spring member 24 resiliently biases the tire plate 20 in an upward direction to maintain tension as is known in the art. The illustrated spring member 24 is a coil compression spring acting between a flange 28 and a lower side of the tire plate 20. Alternatively, the spring member 24 can be a finger spring device, a resilient member such as an elastomeric member, a combination of a spring and elastomeric member, or the like.

The illustrated winch assembly 14 includes a shaft 30, a sheave or reel 32 mounted on the shaft 30 and rotatable about the shaft 30, a drive member 18 secured to the shaft 30 for rotation therewith and engages the sheave 32 to selectively rotate the sheave 32 upon rotation of the shaft 30, and an elongate flexible member 34 which is wound and unwound upon the sheave 32 upon rotation of the sheave 32. The flexible member 34 can be a cable, rope, chain, cord, or the like which is selectively wound onto and off of the sheave 32. The illustrated flexible member 34 has a first or upper end secured to the sheave 32 and a second or lower end extending through the tubular portion 26 if the swivel 22 so that the tire plate 20 is raised to the stowed position and lowered to the accessed position as the flexible member 34 is wound upon and unwound from the sheave 32 respectively. It is noted that any other suitable winch assembly 14 known in the art can be utilized within the scope of the present invention.

The illustrated shaft 30 extends through the housing assembly 16 and is mounted for rotation about its central axis 36. The shaft 30 is mounted for rotation by an actuation member 38. The illustrated actuation member is a motor 40 but other suitable means can be utilized such as for example a manually-operated device or the like. The motor 40 is operatively coupled to the shaft 30 through a gearbox 42 to increase the output torque and speed of rotation. When the motor 40 is not activated, a self-locking feature of the gearbox 42 preferably prevents counter rotation of the shaft 30 and undesirable movement of the tire carrier 12 from the stored position to the accessed position due to tire weight and/or tension force in the flexible member 34. Optionally, the motor 40 can be coupled directly to the shaft 30 in order to eliminate the gearbox 42. However, in this instance it is advantageous for the motor 40 to have a mechanical stop such as, for example, a solenoid activated brake or for the winch assembly 14 to have a secondary lock to prevent the shaft 30 from counter rotating and the tire carrier 12 from undesirably moving from the stowed position to the accessed position.

The illustrated motor 40 is a permanent magnet direct current (DC) motor, which can selectively rotate in either direction depending on the provided control signal. Alternatively, the motor 40 may be a hydraulic, pneumatic or vacuum motor that is connected by conventional means to a corresponding supply source and regulation devices as are well known in the art. Operation of the motor 40 is preferably controlled by an electronic control module (ECU).

The illustrated housing assembly 16 includes a housing 44, a cover plate 46, and a mounting bracket or cover 48. The housing 44 is generally shaped and sized to enclose the sheave 32 and the flexible member 34 within a hollow interior space or cavity 50. The housing 44 partially forms the cavity 50 with an open side for insertion of the sheave 32 therethrough when the cover plate 46 is not attached thereto. The housing 44 also has a passage in its bottom wall to permit passage of the flexible member 34 from the sheave 32 to the swivel 22. The illustrated cover plate 46 is generally planar and is adapted to be secured by conventional fasteners 52 through suitable apertures in bosses in the housing 44 to close the open side of the housing 44 when secured thereto. The fasteners 52 securing the cover plate 46 extend through apertures the bosses in the housing 44 to cooperate with the mounting bracket 48 and the gearbox 42. The mounting bracket 48 and the cover plate 46 are on opposite sides of the housing 44. The mounting bracket 48 includes a hole 54 to form a passage through which the shaft 30 can pass from the gearbox 42 to the sheave 32. The housing 44, the cover plate 46 and the mounting bracket 48 may be made of any suitable material including thermoplastic, thermoset plastic, steel, aluminum, and composite materials. It is noted that any other suitable housing assembly 16 known in the art can be utilized within the scope of the present invention.

Figure 3:
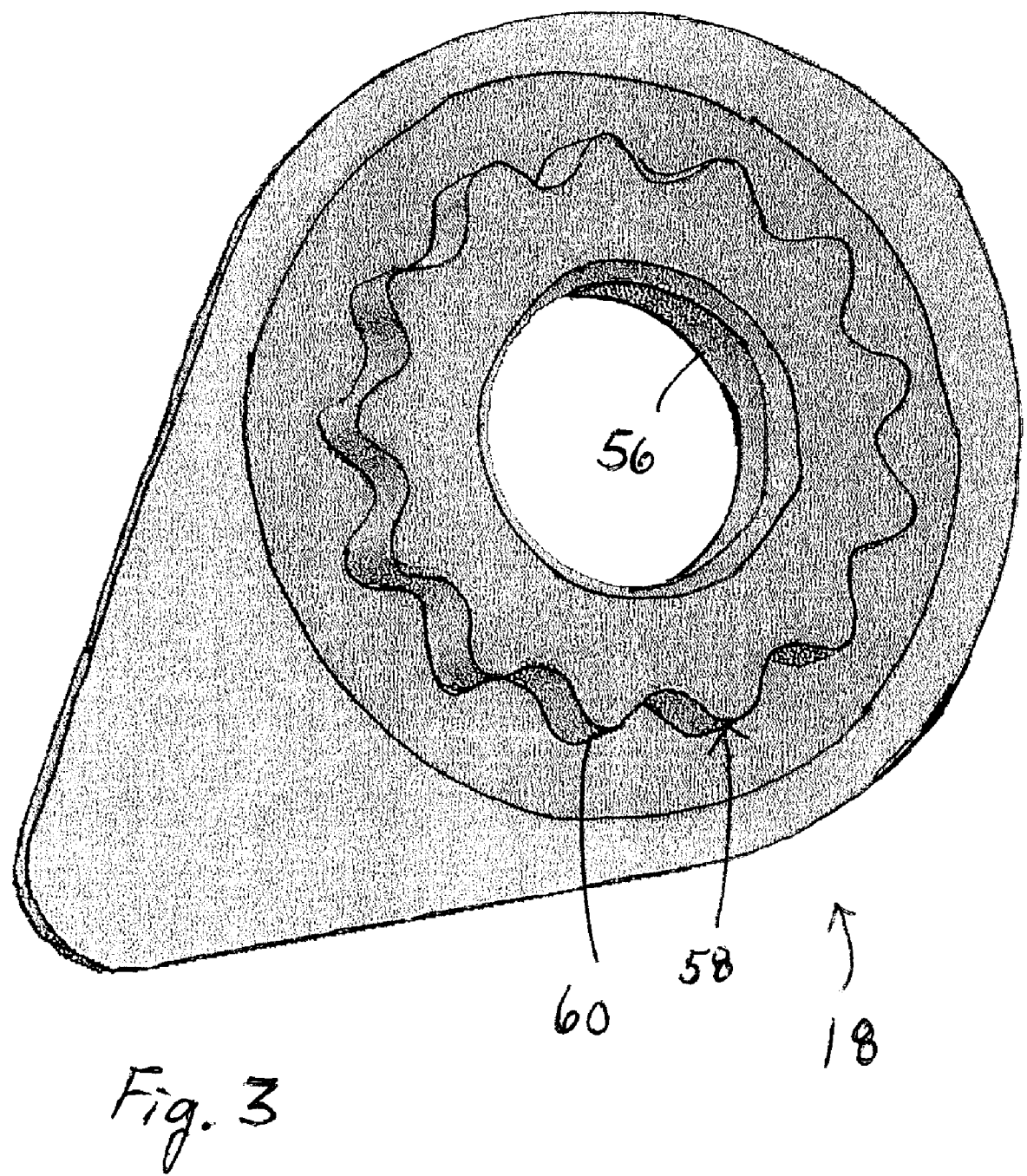
FIG. 3 is a perspective view of a drive member of the tire carrier assembly of FIG. 1.

The illustrated drive member 18 rigidly secured to the shaft 30 for rotation therewith and engages the sheave 32 to selectively rotate the sheave 32 upon rotation of the shaft 30. As best shown in FIG. 3, the illustrated drive member 18 has a central opening 56 for passage of the shaft 30 therethrough and a gear 58 formed thereon for cooperation with the sheave 32 as described in more detail hereinafter. The illustrated gear 58 has a plurality of radially outwardly extending gear teeth 60. The drive member 18 can be formed of any suitable material or materials such, for example, as a metal like steel.

Figure 2:
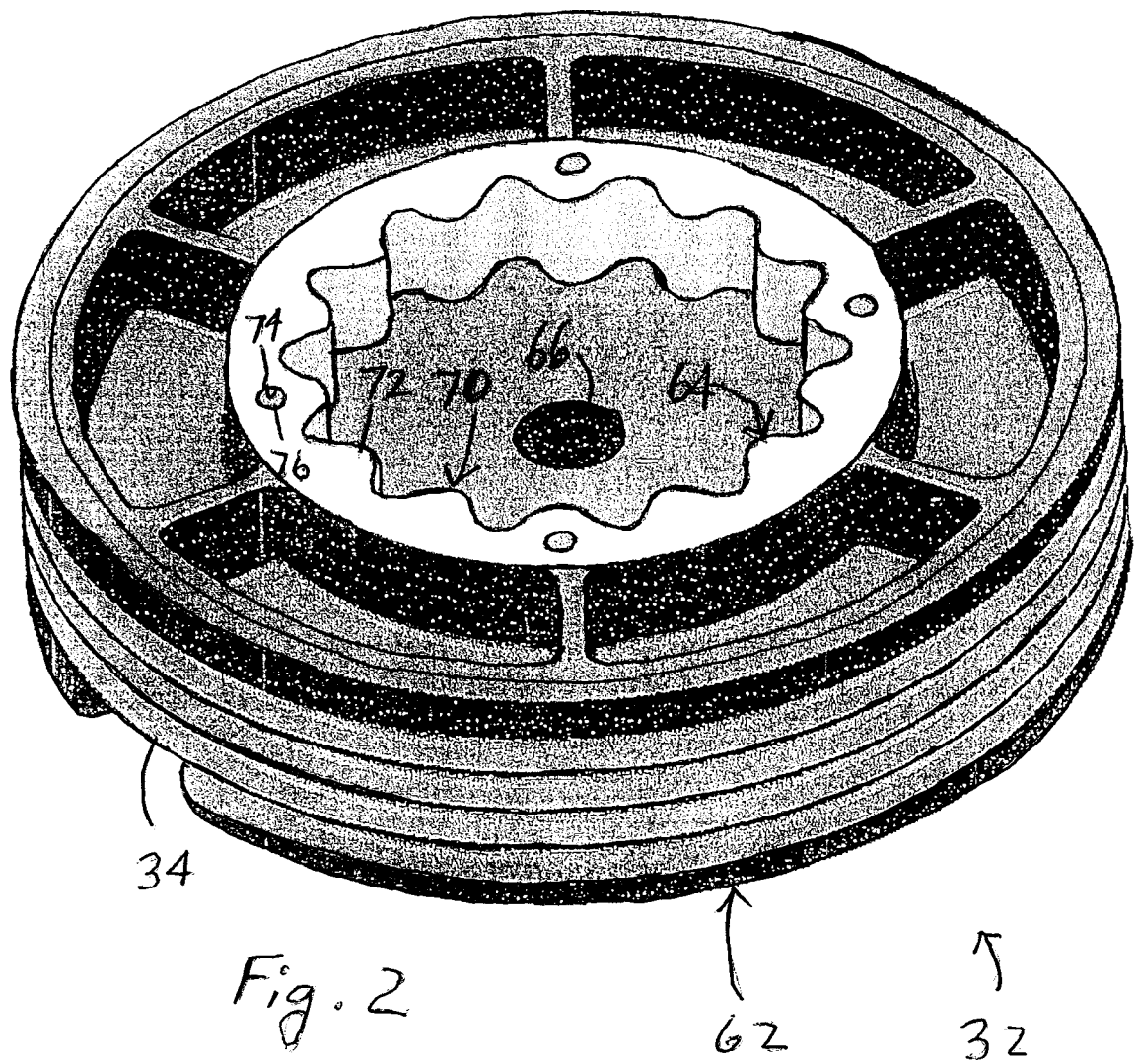
FIG. 2 is a perspective view of a sheave of the tire carrier assembly of FIG. 1.

The illustrated sheave 32 is mounted on the shaft 30 and is rotatable relative to the shaft 30. As best shown in FIG. 2, the illustrated sheave 32 has a first or reel portion 62 and a second or gear portion 64. The illustrated reel portion 62 has a central opening 66 sized and shaped for passage of the shaft 30 therethrough so that the sheave 32 is rotatably supported by the shaft 30 and a reel 68 sized and shaped for winding and unwinding the flexible member 34 thereon upon rotation of the sheave 32. The reel portion 62 can be formed by any suitable material such as, for example, a polymer material, a composite or the like. The illustrated gear portion 64 forms a gear 70 sized and shaped for receiving and cooperating with the gear 58 of the drive member 18. The illustrated gear 70 has a plurality of radially inwardly extending gear teeth 72 sized and shaped to cooperate with the gear teeth 60 of the drive member 18 so that when the teeth 60, 72 are engaged, rotation of the shaft 30 and drive member 18 rotates the sheave 32. The gear portion 64 can be formed by any suitable material such as, for example, a metal like steel.

The illustrated sheave 32 is constructed so that the gear or drive connection between the sheave 32 and the drive member 18 is broken upon a predetermined load or torque indicative of a catastrophic event that may otherwise shear the flexible member 34. By breaking the drive connection at a predetermined load, the sheave 32 freely rotates relative to the shaft 30 to pay out the flexible member 34 and prevent failure of the flexible member 34. This process can be highly controlled so that the gear or drive connection "breaks-away" at a precise torque.

The illustrated sheave 32 is a constructed wherein the reel portion 62 is a polymer composite material which is insert molded onto the gear portion 64 which is steel. The gear portion 64 is provided with a plurality of openings 74 into which the polymer composite material 76 flows. The breakaway torque between the reel portion 62 and the gear portion 64 can be precisely controlled by the size, shape and quantity of the openings 74. The illustrated gear portion 64 has four equally spaced apart openings 74 but any other suitable shape and quantity can alternatively be utilized. It is noted that the reel portion 62 and the gear portion 64 can alternatively be secured together in any other suitable manner.

When the spare tire is in its stored position and the operator desires to change a flat tire, the operator activates the motor 40 which through the gearbox 42 rotates the shaft 30. Rotation of the shaft 30 rotates the drive member 18 which is rigidly secured to the shaft 30 for rotation therewith. Rotation of the drive member 18 rotates the sheave 32 through the gear or drive connection formed by the gears 58, 70. Rotation of the sheave 32 unwinds the flexible member 34 from the reel portion 62 to lower the spare tire. When the spare tire reaches the accessed position the motor 40 is deactivated. To raise the carrier 12 back to the stored position, the motor 40 is activated to rotate the shaft 30 in the opposite direction to wind the flexible member 34 onto the reel portion 62 of the sheave 32. If while in the stored position a catastrophic event occurs, such as a high impact collision, wherein a load or torque at or greater than the predetermined break-away torque is applied to the sheave 32, the connection between the reel portion 62 and the gear portion 64 is broken so that the drive connection between the sheave 32 and the drive member 18 is broken and the sheave reel portion 62 freely rotates on the shaft 30 to pay the flexible member 34. Thus, failure of the flexible member 34 is prevented. The spare tire can be permitted to drop to the accessed position or can be caught by a secondary latch or other means to retain the spare tire within the confines of the motor vehicle. It is noted that alternatively the drive member 18 can be constructed to break the drive connection instead of the sheave 32.

From the foregoing disclosure and detailed description of certain preferred embodiments of the present invention, it is apparent that the tire carrier assembly 10 of the present invention prevents the failure of flexible member or cable 34 which is costly to replace and enables the secondary latch to be eliminated when desired.

From the foregoing disclosure and detailed description of certain preferred embodiments of the present invention, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A tire carrier assembly for storing a spare tire on a vehicle, said tire carrier assembly comprising, in combination:

a carrier adapted for supporting the spare tire;

a rotatable sheave;

a flexible member operably connecting the carrier to the sheave;

wherein the flexible member is wound upon and unwound from the sheave upon rotation of the sheave to raise and lower the carder between a stowed position wherein the carrier is inaccessible and a deployed position wherein the carrier is accessible;

a drive member operably connected to the sheave to selectively drive the sheave so that the sheave rotates;

wherein the drive connection between the drive member and the sheave is broken upon a predetermined torque so that the sheave is freely rotatable to prevent failure of the flexible member and wherein the sheave has a first portion forming a reel for winding and unwinding the flexible member and a second portion forming the drive connection with the drive member and the first portion breaks away from the second portion at the predetermined torque so that the reel is freely rotatable.

2. The tire carrier assembly according to claim 1, wherein the drive member forms a first gear and the second portion of the sheave forms a second gear and the first and second gears cooperate to form the drive connection.

3. The tire carrier assembly according to claim 1, wherein the first portion comprises a polymer material and the second portion comprises a metal.

4. The tire carrier assembly according to claim 3, wherein the first portion is molded to the second portion.

5. The tire carrier assembly according to claim 4, wherein the second portion has a plurality of openings and the first portion extends into the openings.

6. The tire carrier assembly according to claim 5, wherein the openings are sized to determine the predetermine torque.

7. The tire carrier assembly according to claim 1, wherein the first portion is molded to the second portion.

8. The tire carrier assembly according to claim 1, wherein the second portion has a plurality of openings and the first portion extends into the openings.

9. The tire carrier assembly according to claim 8, wherein the openings are sized to determine the predetermine torque.

10. A tire carrier assembly for storing a spare tire on a vehicle, said tire carrier assembly comprising, in combination:
   a carrier adapted for supporting the spare tire;
   a rotatable sheave;
   a flexible member operably connecting the carrier to the sheave;
   wherein the flexible member is wound upon and unwound from the sheave upon rotation of the sheave to raise and lower the carrier between a stowed position wherein the carrier is inaccessible and a deployed position wherein the carrier is accessible;
   a drive member operably connected to the sheave to selectively drive the sheave so that the sheave rotates;
   wherein the sheave has a first portion forming a reel for winding and unwinding the flexible member and a second portion forming the drive connection with the drive member; and
   wherein the first portion breaks away from the second portion at a predetermined torque so that the reel is freely rotatable to prevent failure of the flexible member.

11. The tire carrier assembly according to claim 10, wherein the drive member forms a first gear and the second portion of the sheave forms a second gear and the first and second gears cooperate to form the drive connection.

12. The tire carrier assembly according to claim 10, wherein the first portion comprises a polymer material and the second portion comprises a metal.

13. The tire carrier assembly according to claim 12, wherein the first portion is molded to the second portion.

14. The tire carrier assembly according to claim 13, wherein the second portion has a plurality of openings and the first portion extends into the openings.

15. The tire carrier assembly according to claim 14, wherein the openings are sized to determine the predetermine torque.

16. The tire carrier assembly according to claim 10, wherein the first portion is molded to the second portion.

17. The tire carrier assembly according to claim 10, wherein the second portion has a plurality of openings and the first portion extends into the openings.

18. The tire carrier assembly according to claim 17, wherein the openings are sized to determine the predetermine torque.

19. A sheave for a tire carrier assembly of a vehicle having a carrier raised and lowered by a flexible member, said sheave comprising, in combination:
   a first portion forming a reel for winding and unwinding the flexible member;
   a second portion forming a gear;
   wherein the first portion comprises a polymer material and the second portion comprises a metal; and
   wherein the first portion is molded to the second portion so that the first portion breaks away from the second portion at a predetermined torque and the reel is freely rotatable to prevent failure of the flexible member.

* * * * *